US012565605B2

(12) United States Patent
 Shin et al.

(10) Patent No.: US 12,565,605 B2
(45) Date of Patent: Mar. 3, 2026

(54) ADHESIVE FILM, OPTICAL MEMBER INCLUDING SAME, AND OPTICAL DISPLAY DEVICE INCLUDING SAME

(71) Applicant: SAMSUNG SDI CO., LTD., Yongin-si (KR)

(72) Inventors: Dong Myeong Shin, Suwon-si (KR); Do Young Kim, Suwon-si (KR); Ji Yeon Kim, Suwon-si (KR); Ji Young Han, Suwon-si (KR); Il Jin Kim, Suwon-si (KR); Kyoung Gon Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 209 days.

(21) Appl. No.: 18/259,057

(22) PCT Filed: Dec. 21, 2021

(86) PCT No.: PCT/KR2021/019495
 § 371 (c)(1),
 (2) Date: Jun. 22, 2023

(87) PCT Pub. No.: WO2022/139403
 PCT Pub. Date: Jun. 30, 2022

(65) Prior Publication Data
 US 2024/0052214 A1 Feb. 15, 2024

(30) Foreign Application Priority Data

Dec. 23, 2020 (KR) ........................ 10-2020-0182671

(51) Int. Cl.
 *C09J 133/10* (2006.01)

(52) U.S. Cl.
 CPC ....... *C09J 133/10* (2013.01); *C09J 2203/326* (2013.01); *C09J 2301/312* (2020.08)

(58) Field of Classification Search
 CPC .......... C08F 220/1804; C08F 220/1808; C08L 33/066; C09J 133/08; C09J 133/10;
 (Continued)

(56) References Cited

U.S. PATENT DOCUMENTS

2008/0213585 A1 9/2008 Moroishi et al.
2014/0184053 A1 7/2014 Cho et al.
 (Continued)

FOREIGN PATENT DOCUMENTS

CN 105602463 A 5/2016
CN 111196912 A 5/2020
 (Continued)

OTHER PUBLICATIONS

Extended European Search Report dated Sep. 24, 2024, issued in corresponding European Patent Application No. 21911470.9 (10 pages).
 (Continued)

*Primary Examiner* — Lawrence D Ferguson
(74) *Attorney, Agent, or Firm* — Womble Bond Dickinson (US) LLP

(57) ABSTRACT

Provided are: an adhesive film formed of an adhesive film composition comprising a (meth)acrylic binder, a (meth) acrylic oligomer, and a curing agent, wherein the adhesive film has a peak temperature of tan δ of about −40° C. or less, and a storage modulus of about 0.3 MPa or less at −20° C., an optical member including same; and an optical display apparatus including same.

16 Claims, 1 Drawing Sheet

(58) Field of Classification Search
CPC ............ C09J 2203/318; C09J 2203/326; C09J
2301/312; C09J 7/10; C09J 7/385; C09J
133/04; C08K 5/29
See application file for complete search history.

(56) References Cited

U.S. PATENT DOCUMENTS

| | | |
|---|---|---|
| 2014/0186603 A1 | 7/2014 | Kim et al. |
| 2016/0137884 A1 | 5/2016 | Yamamoto et al. |
| 2017/0218231 A1 | 8/2017 | Suzuki |
| 2021/0246338 A1 | 8/2021 | Takarada et al. |

FOREIGN PATENT DOCUMENTS

| | | | |
|---|---|---|---|
| CN | 111286277 A | | 6/2020 |
| CN | 111902275 A | | 11/2020 |
| JP | 2003-327926 A | | 11/2003 |
| JP | 2004-263165 A | | 9/2004 |
| JP | 2004-323543 A | | 11/2004 |
| JP | 2013-018871 A | | 1/2013 |
| JP | 2016-069647 A | | 5/2016 |
| JP | 2016-102195 A | | 6/2016 |
| JP | 2016-199701 A | | 12/2016 |
| JP | 2020-083996 A | | 6/2020 |
| JP | 2020-125370 A | | 8/2020 |
| JP | 2020-147739 A | | 9/2020 |
| KR | 10-2014-0069680 A | | 6/2014 |
| KR | 10-2014-0085299 A | | 7/2014 |
| KR | 10-2017-0070753 A | | 6/2017 |
| KR | 10-2017-0077768 A | | 7/2017 |
| KR | 10-2017-0114642 A | | 10/2017 |
| KR | 10-2338420 B1 | | 12/2021 |
| TW | 201420715 A | * | 6/2014 |
| WO | WO 2020/158484 A1 | | 8/2020 |

OTHER PUBLICATIONS

International Search Report of PCT/KR2021/019495, Apr. 4, 2022, 6 pp.
Chinese Office Action dated Jul. 1, 2025, issued in corresponding Chinese Patent Application No. 202180087215.X (21 pages).
Japanese Office Action dated Oct. 21, 2025, issued in corresponding Japanese Patent Application No. 2023-537639 (7 pages).

* cited by examiner

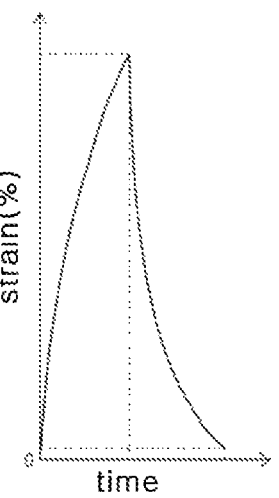

ADHESIVE FILM, OPTICAL MEMBER INCLUDING SAME, AND OPTICAL DISPLAY DEVICE INCLUDING SAME

CROSS-REFERENCE TO RELATED APPLICATIONS

This application is a U.S. National Phase Patent Application of International Application Number PCT/KR2021/019495, filed on Dec. 21, 2021, which claims priority to Korean Patent Application Number 10-2020-0182671, filed on Dec. 23, 2020, the entire content of each of which is incorporated herein by reference.

TECHNICAL FIELD

The present invention relates to an adhesive film, an optical member including the same, and an optical display apparatus including the same.

BACKGROUND ART

In recent years, with rapid increase in interest in foldable displays, development of adhesive films included in the foldable displays has continued. The adhesive films are required to have good properties in terms of optical transparency, peel strength with respect to an adherend, and foldability.

In a well-known method of forming such an adhesive film, a composition including a (meth)acrylic-based monomer, a crosslinking agent and a photopolymerization initiator is deposited onto a release film or an adherend to form a coating layer, followed by curing the coating layer by a light irradiation including UV irradiation.

However, since the composition (solvent-free composition) does not contain a solvent in consideration of UV irradiation, it is difficult to form an adhesive film having a thickness of 20 μm or less. In addition, since the solvent-free composition exhibits poor coatability due to high viscosity thereof, the solvent-free composition has a limitation in thin and uniform coating, thereby making it difficult to reduce the thickness of the final adhesive film while securing a uniform surface of the adhesive film.

In recent years, as the irradiated intensity of external UV light increases, light emitting diodes and the like inside the optical display apparatus can be damaged by external UV irradiation, causing deterioration in reliability and lifespan of the optical display apparatus. Accordingly, a method of adding a UV absorbent to the adhesive film may be considered. However, in formation of the adhesive film through UV curing by UV irradiation, there is a limitation in amount of the UV absorbent due to decrease in curing rate by the UV absorbent, thereby making it difficult to obtain a desired adhesive film.

The background technique of the present invention is disclosed in Korean Patent Laid-open Publication No. 10-2017-0070753 and the like.

DISCLOSURE

Technical Problem

It is an object of the present invention to provide an adhesive film that has a thin thickness and a uniform surface while securing high peel strength and excellent foldability at low temperature.

It is another object of the present invention to provide an adhesive film that is formed of a thermal curable composition and can secure high peel strength and excellent foldability at low temperature.

It is a further object of the present invention to provide an adhesive film that can improve lifespan and reliability of elements inside a panel through reduction in transmission of external UV light therethrough.

Technical Solution

One aspect of the present invention relates to an adhesive film.

1. The adhesive film adhesive film formed of a composition for the adhesive film, the composition comprising a (meth)acrylic-based binder, a (meth)acrylic-based oligomer, and a curing agent, wherein the adhesive film has a peak temperature of tan δ value of about −40° C. or less and a storage modulus of about 0.3 MPa or less at −20° C.

2. The adhesive film has a peak temperature of tan δ value of about −40° C. or less and a storage modulus of about 0.3 MPa or less at −20° C., wherein the adhesive film has a peel strength of about 600 gf/25 mm or more with respect to a glass plate or SUS.

3. In 1 and 2, the adhesive film may have a thickness of about 20 μm or less.

4. In 1, the adhesive film may have a peel strength of about 600 gf/25 mm or more with respect to a glass plate or SUS.

5. In 1 to 4, the adhesive film may have a shear strain of about 18% or more.

6. In 1 to 5, the adhesive film may have a variation rate of shear strain of about 10% or less, as calculated by Equation 1:

$$\text{Variation rate of shear strain}=[|B{-}A|/A]\times100, \qquad \text{[Equation 1]}$$

(wherein the Equation 1, A is initial shear strain of the adhesive film (unit: %); and B is shear strain of the adhesive film (unit: %) after high temperature and high humidity testing, as measured after the adhesive film is left at 60° C. and 95% relative humidity for 10 days and then left at 25° C. for 2 hours).

7. In 2, the adhesive film may be formed of a composition for the adhesive film, the composition comprising a (meth)acrylic-based binder, a (meth)acrylic-based oligomer, and a curing agent.

8. In 1 to 7, the (meth)acrylic-based binder may have a glass transition temperature of about −55° C. or less.

9. In 1 to 8, the (meth)acrylic-based binder may include a (meth)acrylic copolymer of a monomer mixture including a (meth)acrylic-based monomer having a glass transition temperature of about −50° C. or less in a homopolymer phase.

10. In 1 to 9, the (meth)acrylic-based monomer having a glass transition temperature of about −50° C. or less in a homopolymer phase may be present in an amount of about 90 wt % to 100 wt % in the monomer mixture.

11. In 1 to 10, the monomer mixture may include about 40 wt % to less than 100 wt % of a (meth)acrylic-based monomer having a glass transition temperature of about −50° C. or less in a homopolymer phase and containing a branched-chain $C_3$ to $C_{10}$ alkyl group and greater than 0 wt % to 60 wt % of a (meth)acrylic-based monomer having a glass transition temperature of about −50° C. or less in a homopolymer phase and containing a linear-chain $C_1$ to $C_{10}$ alkyl group.

12. In 1 to 11, the (meth)acrylic-based oligomer may have a glass transition temperature of about 50° C. or more.

13. In 1 to 12, the (meth)acrylic-based oligomer may include an oligomer of a monomer mixture including a hydroxyl group-containing (meth)acrylic-based monomer.

14. In 1 to 13, the (meth)acrylic-based oligomer may have a weight average molecular weight of about 3,000 to about 50,000.

15. In 1 to 14, the curing agent may include an isocyanate-based curing agent and the composition for the adhesive film may include 100 parts by weight of the (meth)acrylic-based binder, about 3 parts by weight or less of the (meth)acrylic-based oligomer, and about 1 part by weight or less of the isocyanate-based curing agent.

16. In 1 to 15, the composition for the adhesive film may further include at least one curing agent selected from among a metal chelate-based curing agent, a carbodiimide-based curing agent, an aziridine-based curing agent, and an epoxy-based curing agent.

17. In 1 to 16, the adhesive film may further include a UV absorbent.

Another aspect of the present invention relates to an optical member including an optical element and an adhesive film formed on at least one surface of the optical element, wherein the adhesive film is the adhesive film according to the present invention.

A further aspect of the present invention relates to an optical display apparatus including the adhesive film according to the present invention.

Advantageous Effects

The present invention provides an adhesive film that has a thin thickness and a uniform surface while securing high peel strength and excellent foldability at low temperature.

The present invention provides an adhesive film that is formed of a thermal curable composition and can secure high peel strength and excellent foldability at low temperature.

The present invention provides an adhesive film that can improve lifespan and reliability of elements inside a panel through reduction in transmission of external UV light therethrough.

DESCRIPTION OF DRAWINGS

FIG. 1 is a cross-sectional view of one example of measurement of shear strain of an adhesive film according to one embodiment of the present invention.

BEST MODE

Hereinafter, embodiments of the present invention will be described in detail. However, it should be understood that the present invention is not limited to the following embodiments and may be embodied in different ways. The following embodiments are provided to provide a thorough understanding of the invention to those skilled in the art.

Herein, "(meth)acryl" may refer to acryl and/or methacryl.

Herein, "copolymer" may include a polymer or a resin.

Herein, "peak temperature of tan δ" means a temperature at which a ratio of loss modulus to storage modulus measured using a rheometer while changing temperature, that is, tan δ, becomes the maximum value.

Herein, "shear strain" refers to a value measured at 60° C. by a creep evaluation method and means a degree of deformation of an adhesive film specimen upon application of constant force to the specimen in a shear direction. Referring to FIG. 1, the shear strain corresponds to the maximum strain in measurement of strain of the adhesive film specimen over time and also corresponds to initial shear strain in measurement of a variation rate of shear strain upon application of constant force to the specimen.

Herein, "glass transition temperature in a homopolymer phase" may refer to a glass transition temperature (Tg) measured on a homopolymer of a target monomer using a differential scanning calorimeter (DSC Discovery, TA Instruments). Specifically, the homopolymer of the target monomer is heated to about 180° C. at a heating rate of about 20° C./min, is slowly cooled to about –100° C., and is heated again to about 100° C. at a heating rate of 10° C./min to obtain data of an endothermic transition curve. An inflection point of the endothermic transition curve may be defined as the glass transition temperature in the homopolymer phase.

As used herein to represent a specific numerical range, the expression "X to Y" means a value greater than or equal to X and less than or equal to Y (X≤ and ≤Y).

An adhesive film according to the present invention is formed of a thermal curable composition and has a thin thickness while securing high peel strength and excellent foldability at low temperature. In addition, the adhesive film according to the present invention can improve lifespan and reliability of elements inside a panel through reduction in transmission of external UV light therethrough.

Hereinafter, an adhesive film according to one embodiment of the present invention will be described.

The adhesive film according to this embodiment (hereinafter 'adhesive film') has a peak temperature of tan δ value of about –40° C. or less and a storage modulus of about 0.3 MPa or less at –20° C. Within these ranges of peak temperature of tan δ value and storage modulus at –20° C., the adhesive film can exhibit good foldability at low temperature.

Specifically, the adhesive film may have a peak temperature of tan δ value of, for example, –70° C., –69° C., –68° C., –67° C., –66° C., –65° C., –64° C., –63° C., –62° C., –61° C., –60° C., –59° C., –58° C., –57° C., –56° C., –55° C., –54° C., –53° C., –52° C., –51° C., –50° C., –49° C., –48° C., –47° C., –46° C., –45° C., –44° C., –43° C., –42° C., –41° C., –40° C., or –70° C. to –40° C., more specifically –50° C. to –40° C. Within this range, the adhesive film can have good foldability at low temperature and can relieve stress applied to a foldable panel at low temperature.

Specifically, the adhesive film may have a storage modulus of, for example, 0.001 MPa, 0.005 MPa, 0.01 MPa, 0.015 MPa, 0.02 MPa, 0.025 MPa, 0.03 MPa, 0.035 MPa, 0.04 MPa, 0.045 MPa, 0.05 MPa, 0.1 MPa, 0.15 MPa, 0.2 MPa, 0.25 MPa, or 0.3 MPa, specifically 0.001 MPa to 0.3 MPa, more specifically 0.05 MPa to 0.25 MPa, as measured at –20° C. Within this range, the adhesive film can have good foldability at low temperature and can relieve stress applied to a foldable panel at low temperature.

The adhesive film has a peel strength of about 600 gf/25 mm or more with respect to an adherend. Within this range, the adhesive film can have high peel strength with respect to the adherend to secure good reliability in folding at room temperature. Herein, "adherend" may be a glass plate (including an alkali-free glass plate or soda lime glass) or SUS (steel use stainless). Herein, "peel strength" is a value measured on a 15 μm thick adhesive film at 25° C. with respect to the adherend. The adhesive film can secure the above peel strength with respect to both the glass plate and SUS as the adherend. The adhesive film according to the present invention has good foldability at low temperature and good peel strength at the same time. For example, the adhesive film may have a peel strength of 600 gf/25 mm, 650 gf/25 mm, 700 gf/25 mm, 750 gf/25 mm, 800 gf/25 mm, 850 gf/25 mm, 900 gf/25 mm, 950 gf/25 mm, 1,000 gf/25 mm, 1,050 gf/25 mm, 1,100 gf/25 mm, 1,150 gf/25 mm, 1,200 gf/25 mm, 1,250 gf/25 mm, 1,300 gf/25 mm, 1,350 gf/25 mm, 1,400 gf/25 mm, 1,450 gf/25 mm, 1,500 gf/25 mm, 1,550 gf/25 mm, 1,600 gf/25 mm, 1,650 gf/25 mm, 1,700 gf/25 mm, 1,750 gf/25 mm, 1,800 gf/25 mm, 1,850 gf/25 mm, 1,900 gf/25 mm, 1,950 gf/25 mm, or 2,000 gf/25 mm. Specifically, the adhesive film may have a peel strength of 600 gf/25 mm to 2,000 gf/25 mm, more specifically 700 gf/25 mm to 1,500 gf/25 mm.

The adhesive film may have a storage modulus of about 0.02 MPa or more, for example, 0.02 MPa, 0.05 MPa, 0.1 MPa, 0.15 MPa, 0.2 MPa, 0.25 MPa, 0.3 MPa, 0.35 MPa, 0.4 MPa, 0.45 MPa, or 0.5 MPa, specifically 0.02 MPa to 0.5 MPa, more specifically 0.02 MPa to 0.1 MPa, as measured at 60° C. Within this range, the adhesive film can have good reliability at high temperature.

The adhesive film may have a ratio of storage modulus at 60° C.:storage modulus at −20° C. of about 1:1 to about 1:20, for example, about 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, or 1:20, specifically 1:2 to 1:10. Within this range, the adhesive film can have good foldability in a wide temperature range including high temperature and low temperature.

The adhesive film may have a shear strain of about 18% or more, for example, 18%, 19%, 20%, 21%, 22%, 23%, 24%, 25%, 26%, 27%, 28%, 29%, 30%, 31%, 32%, 33%, 34%, 35%, 36%, 37%, 38%, 39%, or 40%, specifically 18% to 40%, more specifically 20% to 35%. Within this range, the adhesive film can secure folding reliability at low temperature.

The adhesive film may have a variation rate of shear strain of about 10% or less, for example, 0%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%, specifically 0.1% to 10%, more specifically 0.1% to 5%, as calculated by the following equation 1. Within this range, the adhesive film can secure good foldability at low temperature even after being left under high temperature and high humidity conditions for a long period of time.

$$\text{Variation rate of shear strain} = [|B-A|/A] \times 100 \qquad \text{[Equation 1]}$$

(wherein the Equation 1, A is initial shear strain of the adhesive film (unit: %); and B is shear strain of the adhesive film (unit: %) after high temperature and high humidity testing, as measured after the adhesive film is left at 60° C. and 95% relative humidity for 10 days and then left at 25° C. for 2 hours).

In Equation 1, each of A and B may be about 18% or more, for example, 18%, 19%, 20%, 21%, 22%, 23%, 24%, 25%, 26%, 27%, 28%, 29%, 30%, 31%, 32%, 33%, 34%, 35%, 36%, 37%, 38%, 39%, or 40%, specifically 18% to 40%, more specifically 20% to 35%. Within this range, the adhesive film can secure folding reliability at low temperature.

The adhesive film may have a thickness of about 20 μm or less, for example, 0.1 μm, 0.5 μm, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, or 20 μm, specifically greater than 0 μm to 15 μm. Within this range, the adhesive film can be advantageously used in manufacturing a thin optical member and an optical display apparatus.

The adhesive film having the peak temperature of tan δ value, the storage modulus at −20° C., the peel strength with respect to the adherend, the shear strain and the variation rate of shear strain within the above ranges is formed of a thermal curable adhesive composition. According to the present invention, the adhesive film having the above properties is formed of the thermal curable composition. As a result, the adhesive film can secure the above effects while improving lifespan and reliability of elements inside a panel by reducing transmission of external UV light without limiting the content of a UV absorbent.

Next, the thermal curable composition (hereinafter referred to as 'composition') will be described.

The composition includes a (meth)acrylic-based binder, a (meth)acrylic-based oligomer, and a curing agent. The (meth)acrylic-based binder has a greater weight average molecular weight than the (meth)acrylic-based oligomer.

The (meth)acrylic-based binder is cured by the curing agent to form a matrix of the adhesive film and can assist in improvement in foldability at low temperature.

The (meth)acrylic-based binder has a glass transition temperature of about −55° C. or less, for example, −70° C., −69° C., −68° C., −67° C., −66° C., −65° C., −64° C., −63° C., −62° C., −61° C., −60° C., −59° C., −58° C., −57° C., −56° C., or −55° C., specifically −70° C. to −55° C. Within this range, the adhesive film even containing the curing agent can reach the peak temperature of tan δ value and the storage modulus at −20° C. within the above ranges, thereby improving foldability at low temperature.

The (meth)acrylic-based binder may include a (meth) acrylic-based copolymer of a monomer mixture that includes a (meth)acrylic-based monomer having a glass transition temperature of about −50° C. or less in a homopolymer phase, for example, −80° C., −79° C., −78° C., −77° C., −76° C., −75° C., −74° C., −73° C., −72° C., −71° C., −70° C., −69° C., −68° C., −67° C., −66° C., −65° C., −64° C., −63° C., −62° C., −61° C., −60° C., −59° C., −58° C., −57° C., −56° C., −55° C., −54° C., −53° C., −52° C., −51° C., −50° C., specifically −80° C. to −50° C. Within this range, the (meth)acrylic-based binder can easily achieve the glass transition temperature thereof and the adhesive film can achieve the peck temperature of tan δ peak value and storage modulus at −20° C. within the above ranges.

The (meth)acrylic-based monomer having a glass transition temperature of about −50° C. or less, specifically −80° C. to −50° C., in a homopolymer phase may be selected from any kind of (meth)acrylic monomer so long as the (meth) acrylic-based monomer can have the glass transition temperature within the above range. The glass transition temperature can be measured by a typical method known to those skilled in the art or by referring to catalogues of the corresponding (meth)acrylic-based monomer.

In some embodiments, the (meth)acrylic-based monomer having a glass transition temperature of about −50° C. or less in a homopolymer phase may include at least one (meth) acrylic-based monomer having a linear-chain or branched-chain $C_1$ to $C_{10}$ alkyl group, for example, at least one (meth)acrylic-based monomer selected from among a $C_1$ alkyl group, a $C_2$ alkyl group, a $C_3$ alkyl group, a $C_4$ alkyl group, a $C_5$ alkyl group, a $C_6$ alkyl group, a $C_7$ alkyl group, a $C_8$ alkyl group, a $C_9$ alkyl group, and a $C_{10}$ alkyl group. For example, the (meth)acrylic-based monomer having a linear-chain or branched-chain $C_1$ to $C_{10}$ alkyl group may include at least one selected from among N-butyl acrylate, 2-ethylhexyl acrylate, isodecyl acrylate, and isononyl acrylate, without being limited thereto.

In some embodiments, the (meth)acrylic-based monomer having a glass transition temperature of about −50° C. or less in a homopolymer phase may be present in an amount of 90 wt % or more, for example, 90 wt %, 91 wt %, 92 wt %, 93 wt %, 94 wt %, 95 wt %, 96 wt %, 97 wt %, 98 wt %, 99 wt %, or 100 wt %, specifically 90 wt % to 100 wt %, in the monomer mixture. Within this range, the binder can easily reach the aforementioned glass transition temperature thereof.

In some embodiments, the monomer mixture may include about 40 wt % to less than about 100 wt %, for example, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, or 99.9 wt %, specifically 40 wt % to 90 wt %, of a (meth)acrylic-based monomer having a glass transition temperature of about −50° C. or less in a homopolymer phase and containing a branched-chain $C_3$ to $C_{10}$ alkyl group, and greater than 0 wt % to 60 wt %, for example, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, or 60 wt %, specifically 10 wt % to 60 wt %, of a (meth)acrylic-based monomer having a glass transition temperature of about −50° C. or less in a homopolymer phase and containing a linear-chain $C_1$ to $C_{10}$ alkyl group. Within this range, the binder can easily reach the aforementioned glass transition temperature.

The monomer mixture may further include a (meth) acrylic-based monomer having a glass transition temperature of greater than about −50° C. in a homopolymer phase. Here, the content of the (meth)acrylic-based monomer having a glass transition temperature of greater than about −50° C. in a homopolymer phase is set to provide no effect on the glass transition temperature range of the binder. For example, the (meth)acrylic-based monomer having a glass transition temperature of greater than about −50° C. in a homopolymer phase may be present in an amount of less than 10 wt %, for example, 0.01 wt %, 0.05 wt %, 0.1 wt %, 1 wt %, 2 wt %, 3 wt %, 4 wt %, 5 wt %, 6 wt %, 7 wt %, 8 wt %, 9 wt %, 9.5 wt %, or 9.9 wt %, specifically 0.01 wt % to less than 10 wt %, in the monomer mixture.

For example, the (meth)acrylic-based monomer having a glass transition temperature of greater than about −50° C. in a homopolymer phase may have a glass transition temperature of greater than about −50° C. to about 150° C., for example, −49° C., −45° C., −40° C., −30° C., −20° C., −10° C., 0° C., 10° C., 20° C., 30° C., 40° C., 50° C., 60° C., 70° C., 80° C., 90° C., 100° C., 110° C., 120° C., 130° C., 140° C., or 150° C., in a homopolymer phase. The (meth)acrylic-based monomer having a glass transition temperature of greater than about −50° C. in a homopolymer phase may include at least one selected from among a hydroxyl group-containing (meth)acrylic-based monomer, an aromatic group-containing (meth)acrylic-based monomer, an alicy-clic group-containing (meth)acrylic-based monomer, a het-ero-alicyclic group containing (meth)acrylic-based mono-mer, and an amino group-containing (meth)acrylic-based monomer.

The (meth)acrylic-based binder may have a weight aver-age molecular weight (Mw) of about 1,500,000 or less, for example, 900,000, 950,000, 1,000,000, 1,050,000, 1,100, 000, 1,150,000, 1,200,000, 1,250,000, 1,300,000, 1,350,000, 1,400,000, 1,450,000, or 1,500,000 g/mol, specifically about 900,000 to about 1,500,000. Within this range, the compo-sition can easily form a matrix of the adhesive film while improving peel strength and reliability of the adhesive film.

The (meth)acrylic-based binder may have a polydisper-sity index (PDI) of about 10 or less, specifically about 3 to about 10. Within this range, the composition can easily form a matrix of the adhesive film while improving peel strength and reliability of the adhesive film.

The (meth)acrylic-based binder may be prepared through polymerization of the monomer mixture by a typical polym-erization method. The polymerization method may include typical methods known to those skilled in the art. For example, the (meth)acrylic-based binder may be prepared by adding an initiator to the monomer mixture, followed by typical copolymerization, for example, suspension polym-erization, emulsion polymerization, solution polymeriza-tion, and the like. Polymerization may be performed at about 60° C. to about 70° C. for about 6 hours to about 8 hours. The initiator may be a typical initiator including an azo-based polymerization initiator and/or peroxides, such as benzoyl peroxide, acetyl peroxide, and the like.

The (meth)acrylic-based oligomer serves to improve peel strength of the adhesive film. Although the adhesive film formed of the thermal curable composition can have a thin thickness, the adhesive film can suffer from deterioration in peel strength. The (meth)acrylic-based oligomer serves to improve cohesion of the adhesive film to improve peel strength of the adhesive film.

The (meth)acrylic-based oligomer may have a glass tran-sition temperature of about 50° C. or more. Within this range, the composition can improve peel strength of the adhesive film. Specifically, the (meth)acrylic-based oli-gomer may have a glass transition temperature of, for example, 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., or 90° C., specifically 50° C. to 90° C., more specifically 50° C. to 80° C. Within this range, the compo-sition can improve peel strength of the adhesive film while improving foldability of the adhesive film at low tempera-ture.

The (meth)acrylic-based oligomer may have a weight average molecular weight of about 3,000 to 50,000, for example, 3,000, 4,000, 5,000, 6,000, 7,000, 8,000, 9,000, 1,0000, 11,000, 12,000, 13,000, 14,000, 15,000, 16,000, 17,000, 18,000, 19,000, 20,000, 30,000, 40,000, or 50,000, specifically 5,000 to 50,000. Within this range, the (meth) acrylic-based oligomer can improve cohesion of the adhe-sive film.

The (meth)acrylic-based oligomer may include an oli-gomer of a monomer mixture including a hydroxyl group-containing (meth)acrylic-based monomer. In the (meth) acrylic-based oligomer, the hydroxyl group serves to improve durability under high temperature and high humidity conditions. In the (meth)acrylic-based oligomer, the hydroxyl group-containing (meth)acrylic-based monomer can improve peel strength of the adhesive film and can secure foldability at low temperature when the (meth) acrylic-based binder is a (meth)acrylic-based binder not containing a cross-linkable functional group, for example, a hydroxyl group or a carboxyl group. The hydroxyl group-containing (meth)acrylic-based monomer may include 4-hydroxybutyl (meth)acrylate and hydroxyethyl (meth)acrylate, without being limited thereto. The hydroxyl group-containing (meth)acrylic-based monomer may be present in an amount of about 0.1 wt % to about 99.9 wt % in the monomer mixture.

As a main component, the (meth)acrylic-based oligomer may include a (meth)acrylic-based monomer having a glass transition temperature of about 90° C. or more, for example, 90° C., 91° C., 92° C., 93° C., 94° C., 95° C., 96° C., 97° C., 98° C., 99° C., 100° C., 101° C., 102° C., 103° C., 104° C., 105° C., 106° C., 107° C., 108° C., 109° C., 110° C., 111° C., 112° C., 113° C., 114° C., 115° C., 116° C., 117° C., 118° C., 119° C., or 120° C., specifically 100° C. to 120° C., in a homopolymer phase. Within this range, the adhesive film can prevent excessive increase in storage modulus at high temperature and can secure the range of the glass transition temperature. For example, the (meth)acrylic-based monomer may be a mono-functional (meth)acrylic-based monomer, specifically methyl acrylate, hydroxyethyl methacrylate, and the like, without being limited thereto. Here, "main component" means that the corresponding monomer is present in an amount of about 50 wt % or more, 60 wt % or more, or 100% or less in the total units of the (meth)acrylic-based oligomer.

The (meth)acrylic-based oligomer may further include a (meth)acrylic-based monomer having a glass transition temperature of about 50° C. or less, for example, –80° C. to 0° C., specifically –80° C., –75° C., –70° C., –65° C., –60° C., –55° C., –50° C., –45° C., –40° C., –35° C., –30° C., –25° C., –20° C., –15° C., –10° C., –5° C., 0° C., 5° C., 10° C., 15° C., 20° C., 25° C., 30° C., 35° C., 40° C., 45° C., or 50° C., in a homopolymer phase as further component.

In some embodiments, the (meth)acrylic-based oligomer may include an oligomer of a monomer mixture including 4-hydroxybutyl (meth)acrylate and methyl methacrylate. The monomer mixture may further include at least one selected from among methacrylic acid and N-butyl (meth) acrylate.

The (meth)acrylic-based oligomer may be present in an amount of about 3 parts by weight or less, for example, 0.001, 0.5, 1, 1.5, 2, 2.5, or 3 parts by weight, specifically 0.001 parts by weight to 3 parts by weight, more specifically 0.01 parts by weight to 1 part by weight, relative to 100 parts by weight of the (meth)acrylic-based binder. Within this range, the composition can improve peel strength of the adhesive film while preventing increase in storage modulus at low temperature.

The curing agent forms a matrix of the adhesive film through heat curing of the (meth)acrylic-based binder while improving reliability of the adhesive film.

The curing agent may include an isocyanate-based curing agent.

In some embodiments, the isocyanate-based curing agent may be free from a urethane bond.

The isocyanate-based curing agent may include a bi- or higher polyfunctional, specifically a bi- to hexa-functional isocyanate-based curing agent. In some embodiments, the isocyanate-based curing agent may include at least one aromatic or aliphatic isocyanate-based curing agent selected from among xylene diisocyanate (XDI) including m-xylene diisocyanate and the like, methylene bis(phenyl isocyanate) (MDI) including 4,4'-methylene bis(phenyl isocyanate) and the like, naphthalene diisocyanate, tolylene diisocyanate, hexamethylene diisocyanate, and isophorone diisocyanate, or adducts thereof. For example, the adducts may be trimethylolpropane adducts of tolylene diisocyanate, trimethylolpropane adducts of hexamethylene diisocyanate, trimethylolpropane adducts of isophorone diisocyanate, trimethylolpropane adducts of xylene diisocyanate, and isocyanurates of tolylene diisocyanate, isocyanurates of hexamethylene diisocyanate, or isocyanurates of isophorone diisocyanate. The composition may include at least one isocyanate-based curing agent selected from among these curing agents.

The isocyanate-based curing agent may be present in an amount of about 1 part by weight or less, specifically 0.01 parts by weight to 1 part by weight, more specifically 0.01 parts by weight to 0.5 parts by weight, relative to 100 parts by weight of the (meth)acrylic-based binder. Within this range, the composition can improve reliability of the adhesive film without increase in storage modulus of the adhesive film at low temperature.

The composition may further include a curing agent free from an isocyanate (hereinafter referred to as "non-isocyanate-based curing agent").

The non-isocyanate-based curing agent may include at least one selected from among a metal chelate-based curing agent, a carbodiimide-based curing agent, an aziridine-based curing agent, and an epoxy-based curing agent. Preferably, the composition may include a metal chelate-based curing agent. The metal chelate curing agent may serve to improve the curing rate of the (meth)acrylic-based binder.

The metal chelate-based curing agent may be selected from among typical curing agents and may be, for example, a curing agent containing a metal, such as aluminum, titan, iron, copper, zinc, tin, titanium, nickel, antimony, magnesium, vanadium, chromium, zirconium, and the like. For example, the metal chelate-based curing agent may include at least one selected from among aluminum ethylacetoacetate diisopropylate, aluminum tris(ethyl acetoacetate), alkylacetoacetate aluminum diisopropylate, aluminum isopropylate, mono-sec-butoxyaluminum diisopropylate, aluminum-sec-butyrate, aluminum ethylate, tetraisopropyl titanate, tetra-n-butyl titanate, butyl titanate dimer, titanium acetylacetonate, titanium octylene glycolate, titanium tetraacetylacetonate, titanium ethylacetate acetate, polyhydroxy titanium stearate lactate, and aluminum acetylacetonate.

The non-isocyanate-based curing agent may be present in an amount of about 5 parts by weight or less, specifically 0.01 parts by weight to 2 parts by weight, relative to 100 parts by weight of the (meth)acrylic-based binder. Within this range, the non-isocyanate-based curing agent can provide additional effects without affecting the effects of the adhesive film according to the present invention.

The composition may further include a silane coupling agent.

The silane coupling agent may improve adhesive strength of the adhesive film. The silane coupling agent may include a typical silane coupling agent known to those skilled in the art. For example, the silane coupling agent may include an epoxy group-containing silane coupling agent, such as glycidoxypropyltrimethoxysilane, glycidoxypropylmethyldimethoxysilane, and the like, without being limited thereto.

The silane coupling agent may be present in an amount of about 0.01 parts by weight to 5 parts by weight relative to 100 parts by weight of the (meth)acrylic-based binder. Within this range, the silane coupling agent allows further improvement in peel strength.

The composition may further include a UV absorbent. In the adhesive film, the UV absorbent severs to prevent damage to light emitting diodes inside a panel by reducing the intensity of external UV light entering the adhesive film. In some embodiments, the adhesive film may have a luminous transmittance of about 20% or less, for example, 0% to 10%, at a wavelength of about 390 nm or less.

The UV absorbent may have a maximum absorption wavelength of about 390 nm or more, specifically 390 nm to 400 nm, more specifically greater than 390 nm to less than 400 nm. Within this range, the UV absorbent can sufficiently absorb external light having a wavelength of 420 nm or less, specifically 400 nm to 420 nm, more specifically 405 nm or less, to prevent damage to light emitting diodes by reducing UV transmittance.

Here, 'maximum absorption wavelength' means a wavelength at which the maximum absorption peak is obtained, that is, a wavelength providing the maximum light absorbency in an absorbency curve that depicts absorbency depending upon the wavelength. The "absorbency" may be measured by a typical method in the art.

The UV absorbent may be present in an amount of about 0.1 wt % to 1.5 wt %, specifically 0.5 wt % to 1 wt %, in the adhesive film. Within this range, the UV absorbent can secure a UV blocking effect without elution of the UV absorbent from the adhesive film.

The UV absorbent may include at least one selected from among indole-based absorbents and triazine-based absorbents, which have the maximum absorption wavelength, without being limited thereto.

The composition may further include additives. The additives may be selected from typical additives for adhesive films well-known to those skilled in the art. For example, the additives may include at least one selected from among pigments, ultraviolet absorbents, leveling agents, and antistatic agents, without being limited thereto.

The composition may further include a solvent. The solvent can increase coatability of the composition to provide an adhesive film having a thin thickness and a uniform surface. The solvent may include a typical type of solvent known to those skilled in the art. For example, the solvent may include methyl ethyl ketone, methyl isobutyl ketone, and ethyl acetate, without being limited thereto. In some embodiments, the composition may be present in an amount of about 20 wt % to 30 wt %, specifically 20 wt % to 25 wt % in terms of solid content. Within this range, the composition can exhibit good coatability.

The adhesive film may have a haze of 2% or less, specifically 0.1% to 1%, and a total luminous transmittance of 90% or more, specifically 95% to 99%, in the visible spectrum (for example, in the wavelength range of 380 nm to 780 nm). Within this range, the adhesive film has good optical transparency and is applicable to an optical display apparatus.

An optical member according to one embodiment includes an optical element and an adhesive film formed on at least one surface of the optical element, wherein the adhesive film includes the adhesive film according to the embodiments of the invention. Accordingly, the optical member exhibits good bending and folding properties to be used in a flexible display apparatus.

In some embodiments, the optical element provides optical functions, for example, polarization, optical compensation, display quality improvement and/or conductivity, to a display apparatus. Examples of the optical element may include a display panel including an OLED panel and the like, a window film, a window, a polarizing film, a polarizing plate, a color filter, a retardation film, an elliptical polarizing film, a reflective polarizing film, an anti-reflection film, a compensation film, a brightness enhancing film, an alignment film, a light diffusion film, a glass shatterproof film, a surface protective film, an OLED device barrier layer, a plastic LCD substrate, and a transparent electrode film including indium tin oxide (ITO), fluorinated tin oxide (FTO), aluminum-doped zinc oxide (AZO), carbon nanotubes (CNT), Ag nanowires, graphene, or the like. These optical elements may be easily manufactured by a person having ordinary knowledge in the art.

For example, a touch panel may be formed by attaching a window or an optical film to a touchpad via the adhesive film. Alternatively, the adhesive film may be applied to a typical polarizing film as in the art.

An optical display apparatus according to the present invention includes the adhesive film according to the present invention.

The optical display apparatus may include an organic light emitting diode display, a liquid crystal display, and the like. The optical display apparatus may include a flexible display. In other embodiments, the optical display apparatus may include a non-flexible display.

Mode for Invention

Next, the present invention will be described in more detail with reference to examples. However, it should be understood that these examples are provided for illustration only and should not be construed in any way as limiting the invention.

Example 1

A (meth)acrylic-based binder was prepared by polymerization of 100 parts by weight of a monomer mixture including 70 parts by weight of 2-ethylhexyl acrylate (2-EHA) and 30 parts by weight of n-butyl acrylate (n-BA).

In terms of solid content, 0.04 parts by weight of a (meth)acrylic-based oligomer 1, 0.2 parts by weight of an isocyanate-based curing agent 2, and 0.06 parts by weight of a silane coupling agent (S-1, Saiden) were mixed with 100 parts by weight of the (meth)acrylic binder, followed by adding methyl ethyl ketone to the mixture to prepare an adhesive composition having a solid content of 20 wt %.

The prepared adhesive composition was coated to a thickness of 15 μm on a first release film (polyethylene terephthalate film) and cured at 100° C. for 3 min, followed by attaching a second release film (polyethylene terephthalate film) thereto, thereby preparing an adhesive sheet having a structure of first release film/adhesive film/second release film.

Examples 2 to 4

Adhesive sheets were prepared in the same manner as in Example 1 except that the kind and/or content of each component were changed as listed in Table 1.

Comparative Examples 1 to 3

Adhesive sheets were prepared in the same manner as in Example 1 except that the kind and/or content of each component were changed as listed in Table 1.

An adhesive film was prepared by peeling the PET film from each of the adhesive sheets prepared in Examples and Comparative Examples and was evaluated as to the properties of Table 1. Results are shown in Table 1.

(1) Peel strength (unit: gf/25 mm): Each of the adhesive sheets prepared in Examples and Comparative Example was cut to a size of 25 mm×25 mm (length×width) and the first release film was removed therefrom. One surface of the PET film (150 mm×25 mm×75 μm (length×width×thickness)) was subjected to corona treatment twice (total dose: 156 doses) while discharging at 78 doses using a corona treatment device. One surface of the adhesive film was attached to the one surface of the PET film subjected to corona treatment and the second release film was removed from the adhesive sheet. Then, the other surface of the adhesive film was attached to a glass plate (soda lime glass) and compressed by a 2 kg hand roller to prepare a specimen.

The prepared specimen was secured to a peel strength tester (TA.XT-Plus Texture Analyzer, Stable Micro System). Peel strength was measured in a zone where peel strength was maintained while allowing the adhesive film and the PET film to be peeled off of the glass plate when the adhesive film and the PET film were pulled off of the glass plate at an angle of 180 degrees at a speed of 300 mm/min using a TA.XT-Plus Texture Analyzer at 25° C.

Peel strength with respect to SUS (steel use stainless, SUS306 plate) instead of the glass plate (soda lime glass) was also measured using the same method.

(2) Storage modulus (unit: MPa): With the release films removed from both sides of the adhesive sheet prepared in each of Examples and Comparative Examples, plural adhesive films were stacked to a thickness of 500 μm. A specimen was prepared by punching the stack using a diameter 8 mm punching machine. Then, storage modulus was measured on the specimen in a temperature sweep test mode under conditions of 1% strain and 1 Hz using a rheometer (DHR3, TA Instrument Inc.) as a dynamic viscoelasticity instrument while increasing temperature from −50° C. to 100° C. at a rate of 5° C./min. Storage modulus was measured at −20° C. and at 60° C.

(3) Shear strain (unit:%) and variation rate of shear strain (unit: %): An adhesive film (100 mm×25 mm (length×width)) was obtained by removing the release films from both sides of the adhesive film prepared in each of Examples and Comparative Examples. Plural adhesive films were stacked to a thickness of 400 followed by punching the stack using a φ8 mm punching machine, thereby preparing a cylindrical specimen (thickness: 400 μm, diameter: 8 mm) having upper and lower surfaces thereof.

The cylindrical specimen was mounted on a rheometer (DHR3, TA Instrument Inc.) as a dynamic viscoelasticity instrument such that the upper and lower surfaces of the specimen were secured to upper and lower jigs, respectively.

Shear strain was measured for 600 sec under conditions of a chamber temperature of 60° C., an axial force of 1 N, and a torque: 2,000 Pa and was set to an initial shear strain.

The adhesive film obtained by removing the release films from both sides of the adhesive film prepared in each of Examples and Comparative Examples was left in a chamber at 60° C. and at 95% RH for 10 days. After the adhesive film was left at 25° C. for 2 hours, shear strain was measured in the same manner as in measurement of the initial shear strain and was set to "shear strain after high temperature and high humidity testing". The variation rate was calculated according to Equation 1.

$$\text{Variation rate of shear strain} = [|B-A|/A] \times 100, \qquad \text{[Equation 1]}$$

(wherein the Equation 1, A is initial shear strain of the adhesive film (unit: %); and
B is shear strain of the adhesive film (unit: %) after high temperature/high humidity testing, as measured after the adhesive film is left at 60° C. and 95% relative humidity for 10 days and then left at 25° C. for 2 hours).

(4) Peak temperature of tan δ value (unit: ° C.): A specimen was prepared in the same manner as in measurement of storage modulus and evaluated as to storage modulus and loss modulus while increasing the temperature. Then, the temperature at which tan δ value defined as the ratio of loss modulus to storage modulus becomes the maximum value was confirmed.

(5) Foldability at low temperature: An adhesive film was obtained by removing the release films from both sides of the adhesive film prepared in each of Examples and Comparative Examples. With the adhesive film interposed between 50 μm thick polyethylene terephthalate (PET) films subjected to corona treatment, the corona treated surface of the PET film was attached to the adhesive film using a roller, followed by aging at room temperature for 12 hours and cutting the stack to a size of 70 mm×140 mm (width×length) to prepare a specimen. The specimen was secured to a flexibility testing machine (CFT-200, Covotech Co., Ltd.) via adhesives (4965, Tesa Co., Ltd.) and subjected to a bending test at −20° C. and at a rate of 30 cycles per minute, where 1 cycle refers to an operation of folding the specimen in the longitudinal direction of the specimen (140 mm length) such that a bent portion of the specimen had a radius of curvature of 3 mm, followed by unfolding the adhesive film. The number of cycles at which cracks were initially generated on the polyethylene terephthalate film was measured while repeating the bending test. A greater number of cycles indicate easier relaxation of stress applied to the polyethylene terephthalate film in the bending test. 100,000 or more cycles were rated as OK and less than 100,000 cycles were rated as NG.

TABLE 1

| | | Example | | | | Comparative Example | | |
|---|---|---|---|---|---|---|---|---|
| | | 1 | 2 | 3 | 4 | 1 | 2 | 3 |
| Monomer mixture | 2-EHA | 70 | 80 | 40 | 40 | 80 | 30 | 50 |
| | n-BA | 30 | 20 | 60 | 60 | 20 | 70 | 50 |
| Binder | Tg | −62 | −62 | −59 | −59 | −62 | −40 | −55 |
| | Mw | $13 \times 10^5$ | $12 \times 10^5$ | $1 \times 10^6$ | $1 \times 10^6$ | $12 \times 10^5$ | $1 \times 10^6$ | $1 \times 10^6$ |
| (Meth)acrylic-based oligomer | Kind | 1 | 2 | 3 | 3 | — | 3 | — |
| | Tg | 60 | 62 | 50 | 50 | — | 50 | — |
| | Molecular weight | 5,000 | 5,000 | 50,000 | 50,000 | — | 50,000 | — |
| | Content | 0.04 | 0.04 | 0.04 | 0.04 | — | 0.04 | — |

TABLE 1-continued

| | | Example | | | | Comparative Example | | |
|---|---|---|---|---|---|---|---|---|
| | | 1 | 2 | 3 | 4 | 1 | 2 | 3 |
| Curing agent | Curing agent 1 | — | — | 0.07 | 0.07 | — | 0.08 | 0.08 |
| | Curing agent 2 | 0.2 | 0.2 | — | — | 0.3 | — | — |
| | Curing agent 3 | — | — | 1 | 1 | — | 1 | 1 |
| Silane coupling agent | | 0.06 | 0.06 | — | 0.06 | 0.06 | 0.06 | 0.06 |
| Thickness | | 15 | 15 | 10 | 15 | 15 | 15 | 15 |
| Peel strength | Glass plate | 840 | 1050 | 700 | 740 | 200 | 800 | 300 |
| | SUS | 742 | 780 | 730 | 804 | 150 | 890 | 290 |
| Storage modulus (MPa) | @-20° C. | 0.06 | 0.229 | 0.116 | 0.113 | 0.159 | 0.34 | 0.106 |
| | @60° C. | 0.025 | 0.025 | 0.034 | 0.033 | 0.006 | 0.036 | 0.03 |
| Shear strain | Initial | 27.3 | 33.5 | 22.1 | 21.2 | 36.0 | 21.1 | 23 |
| | After high temperature/high humidity testing | 26.9 | 31.8 | 21.7 | 20.5 | 15.2 | 19.6 | 8.7 |
| | Variation rate of Equation 1 | 1.5 | 5.1 | 1.8 | 3.3 | 57.8 | 7.1 | 62.2 |
| Tan δ peak temperature | | −46 | −43 | −43 | −43 | −41 | −27 | −40 |
| Foldability at low temperature | | OK | OK | OK | OK | OK | NG | OK |

*(meth)acrylic-based oligomer 1: NCI, oligomer formed of 4-hydroxybutyl acrylate and methyl methacrylate
*(meth)acrylic-based oligomer 2: NCI, oligomer formed of 4-hydroxybutyl acrylate, methyl methacrylate, and methacrylic acid
*(meth)acrylic-based oligomer 3: Saiden, oligomer formed of 4-hydroxybutyl acrylate, methyl methacrylate, methacrylic acid, and n-butyl acrylate
*(meth)acrylic-based oligomer 4: Saiden, oligomer formed of 4-hydroxybutyl acrylate, methyl methacrylate, methacrylic acid, and tert-butyl methacrylate
*curing agent 1: Saiden, toluene diisocyanate-based curing agent
*curing agent 2: NCI, hexamethylene diisocyanate-based curing agent
*curing agent 3: Saiden, metal chelate-based curing agent As shown in Table 1, each of the adhesive films according to the present invention had a thin thickness, a uniform surface, high peel strength and good foldability at low temperature. The adhesive films according to the present invention were formed of the thermal curable compositions and had high peel strength and good foldability at low temperature. Although not shown in Table 1, the adhesive film according to the present invention can improve lifespan and reliability of elements inside a panel by reducing transmission of external UV therethrough.

However, as shown in Table 1, none of the adhesive films of Comparative Examples not having the features of the present invention satisfied the above effects of the present invention.

It should be understood that various modifications, changes, alterations, and equivalent embodiments can be made by those skilled in the art without departing from the spirit and scope of the present invention.

The invention claimed is:

1. An adhesive film formed of a composition for the adhesive film, the composition comprising a (meth)acrylic-based binder, a (meth)acrylic-based oligomer, and a curing agent, wherein the adhesive film has a peak temperature of tan δ value of about −40° C. or less and a storage modulus of about 0.3 MPa or less at −20° C., and wherein the curing agent comprises an isocyanate-based curing agent, and the composition for the adhesive film comprises 100 parts by weight of the (meth)acrylic-based binder, about 3 parts by weight or less of the (meth)acrylic-based oligomer, and about 1 part by weight or less of the isocyanate-based curing agent.

2. An adhesive film formed of a composition for the adhesive film, the adhesive film having a peak temperature of tan δ value of about −40° C. or less and a storage modulus of about 0.3 MPa or less at −20° C., wherein the adhesive film has a peel strength of about 600 gf/25 mm or more with respect to a glass plate or steel use stainless, and wherein the composition for the adhesive film comprises at least one curing agent selected from among a metal chelate-based curing agent, a carbodiimide-based curing agent, an aziridine-based curing agent, and an epoxy-based curing agent.

3. The adhesive film according to claim 1, wherein the adhesive film has a thickness of about 20 μm or less.

4. The adhesive film according to claim 1, wherein the adhesive film has a peel strength of about 600 gf/25 mm or more with respect to a glass plate or steel use stainless.

5. The adhesive film according to claim 1, wherein the adhesive film has a shear strain of about 18% or more.

6. The adhesive film according to claim 1, wherein the adhesive film has a variation rate of shear strain of about 10% or less, as calculated by Equation 1:

$$\text{Variation rate of shear strain} = [|B-A|/A] \times 100, \quad \text{[Equation 1]}$$

where, in the Equation 1, A is initial shear strain of the adhesive film (unit: %); and B is shear strain of the adhesive film (unit: %) after high temperature and high humidity testing, as measured after the adhesive film is left at 60° C. and 95% relative humidity for 10 days and then left at 25° C. for 2 hours.

7. The adhesive film according to claim 2, wherein the composition for the adhesive film further comprises a (meth) acrylic-based binder, a (meth)acrylic-based oligomer, and an isocyanate-based curing agent.

8. The adhesive film according to claim 1, wherein the (meth)acrylic-based binder has a glass transition temperature of about −55° C. or less.

9. The adhesive film according to claim 1, wherein the (meth)acrylic-based binder comprises a (meth)acrylic-based copolymer of a monomer mixture comprising a (meth) acrylic-based monomer having a glass transition temperature of about −50° C. or less in a homopolymer phase.

10. The adhesive film according to claim 9, wherein the (meth)acrylic-based monomer having a glass transition temperature of about −50° C. or less in a homopolymer phase is present in an amount of about 90 wt % to 100 wt % in the monomer mixture.

11. The adhesive film according to claim 9, wherein the monomer mixture comprises about 40 wt % to less than 100 wt % of a (meth)acrylic-based monomer having a glass transition temperature of about −50° C. or less in a homopolymer phase and containing a branched-chain $C_3$ to $C_{10}$ alkyl group and greater than 0 wt % to 60 wt % of a (meth)acrylic monomer having a glass transition temperature of about −50° C. or less in a homopolymer phase and containing a linear-chain $C_1$ to $C_{10}$ alkyl group.

12. The adhesive film according to claim 1, wherein the (meth)acrylic-based oligomer has a glass transition temperature of about 50° C. or more.

13. The adhesive film according to claim 1, wherein the (meth)acrylic-based oligomer comprises an oligomer of a monomer mixture comprising a hydroxyl group-containing (meth)acrylic-based monomer.

14. The adhesive film according to claim 1, wherein the (meth)acrylic-based oligomer has a weight average molecular weight of about 3,000 to 50,000.

15. The adhesive film according to claim 1, wherein the composition for the adhesive film further comprises at least one curing agent selected from among a metal chelate-based curing agent, a carbodiimide-based curing agent, an aziridine-based curing agent, and an epoxy-based curing agent.

16. An adhesive film formed of a composition for the adhesive film, the composition comprising a (meth)acrylic-based binder, a (meth)acrylic-based oligomer, and a curing agent, wherein the adhesive film has a peak temperature of tan δ value of about −40° C. or less and a storage modulus of about 0.3 MPa or less at −20° C., and wherein the adhesive film further comprises a UV absorbent.

* * * * *